United States Patent

[11] 3,627,933

[72] Inventors Jim C. Garrett; Robert H. Johnson, both of 3300 East Spring St., Long Beach, Calif. 90806

[21] Appl. No. 857,392
[22] Filed Sept. 12, 1969
[45] Patented Dec. 14, 1971

[54] DEVICE FOR TRACING A TELEPHONE SWITCH TRAIN
3 Claims, 4 Drawing Figs.

[52] U.S. Cl. .......... 179/175.2, 179/18 FH
[51] Int. Cl. .......... H04m 3/26
[50] Field of Search .......... 179/18 FH, 175.1; 331/47, 64, 137

[56] References Cited

UNITED STATES PATENTS

| | | | |
|---|---|---|---|
| 2,776,420 | 1/1957 | Woll | 331/64 |
| 2,780,752 | 2/1957 | Aldrich et al. | 331/64 |
| 3,316,502 | 4/1967 | Karras | 331/137 |
| 3,460,136 | 8/1969 | Jambazian | 331/47 |
| 3,521,001 | 7/1970 | Pearce et al. | 179/18 FH |

*Primary Examiner*—Kathleen H. Claffy
*Assistant Examiner*—Douglas W. Olms
*Attorney*—Hyman Jackman

ABSTRACT: A self-contained, solid-state device adapted for connection to a switch test jack of a telephone central office and requiring no external electrical power, comprising means to hold the switch train regardless of correct or reversed polarity of the trunk, a blinking light serving as a visual reminder that the device is in position to trace a call through the central office and that the switch train is being held up for tracing or testing purposes, using loop resistance to hold the switch train forward, a grounded sleeve contact to hold the train backward, and an audio range oscillator to place a clear and distinct interrupted trace tone on the train being held up.

INVENTORS
JIM C. GARRETT
ROBERT H. JOHNSON
BY
[signature]
ATTORNEY

DEVICE FOR TRACING A TELEPHONE SWITCH TRAIN

BACKGROUND OF THE INVENTION

1. Field of the Invention

For tracing a call through a central telephone office; for tracing a series of telephone switches; for controlling such switches while tracing is taking place; to provide means to place an audible signal on each switch independent of line polarity and regardless of whether or not the line (Ring and Tip) is shorted; and to provide visual means of recognizing whether the device is functioning. The present means may be used in conjunction with step-by-step telephone switching systems.

2. Description of the Prior Art

Known prior line or trunk tracing means or devices require external power to operate; are usually not unitary (self-contained) but rather require to be connected up component by component; will not hold the switch train should the polarity of the trunk be reversed; and do not provide a telltale apprising of the fact that the switch train is being held up for tracing or testing purposes.

SUMMARY OF THE INVENTION

A unitary plug-in type of device for the purposes above enumerated, that consists of a high-frequency (1,000 cycles per second) oscillator, a low-frequency (3 cycles per second) oscillator, the former a phase shift means and the latter an interrupter means for controlling intermittent flashing of an indicator lamp to enhance visual recognition during operation, and means placing a resistor between tip and ring by placing a ground on the sleeve thereby to hold the switch train.

The above device provides the following competitive features:

An interrupted trace tone that is clearly distinguishable from other tones commonly found in central office equipment;

Transmission of the trace tone with respect to AC ground and detection thereof even with tip and ring shorted;

Operation regardless of tip and ring polarities;

A clearly visible and distinguishing function-indicating signal;

Retention of the switch train toward its terminating end and holding the same toward the originating end; and Derivation of the power of the device from the switch to which it is connected.

An object of the invention is to provide a small, compact and efficient device having the characteristics above-outlined for facilitating the tracing of a call through a central office.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

BRIEF DESCRIPTION OF THE DRAWING

In the drawing, like reference characters designate similar parts in the several views.

DESCRIPTION OF THE PREFERRED EMBODIMENT

Figures 1, 2, 3, 4:
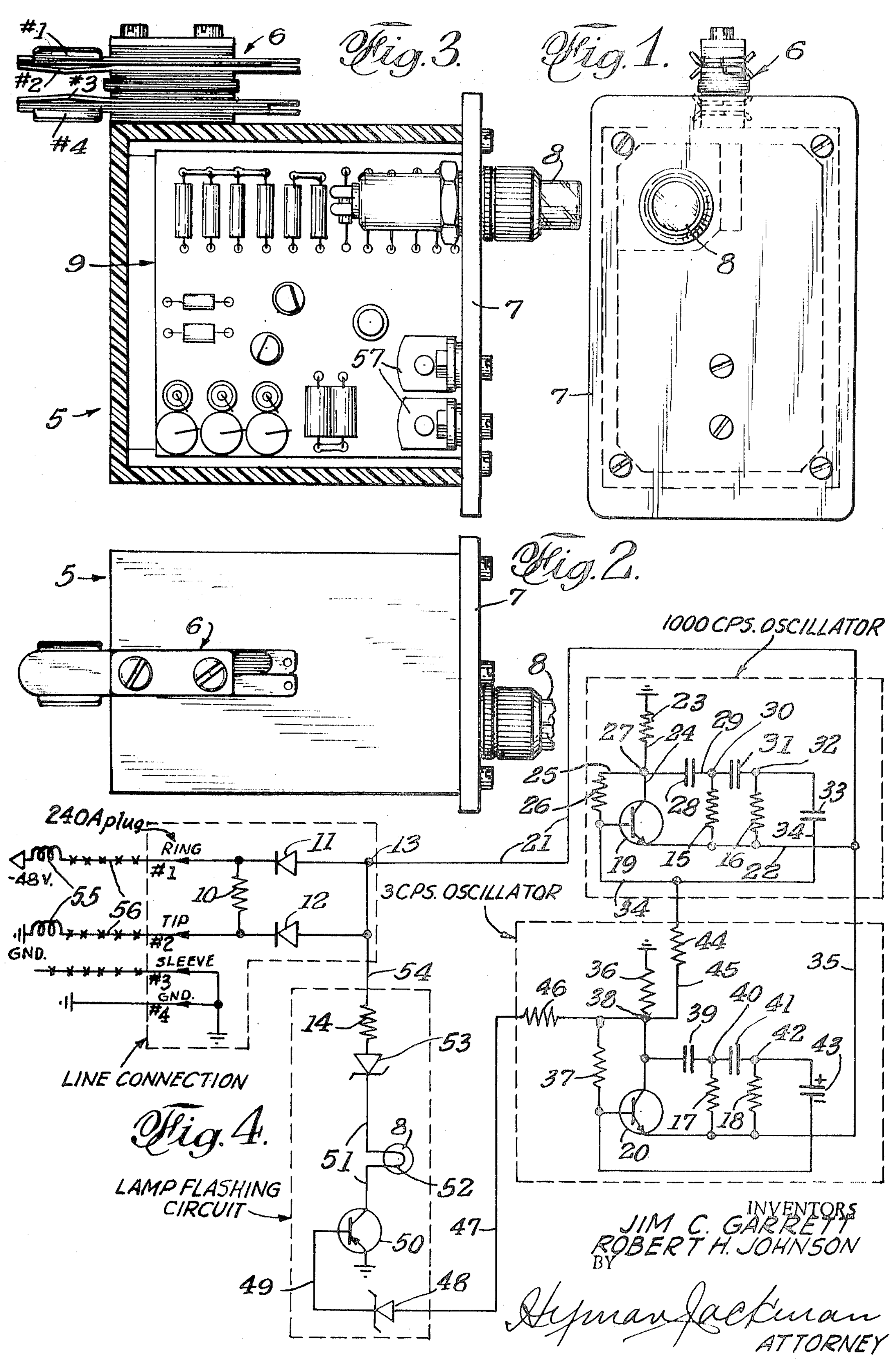
FIG. 1 is a front elevational view of a device for tracing a telephone switch train according to the present invention.
FIG. 2 is a top plan view thereof.
FIG. 3 is a side view with the housing in section to expose the electrical components of the device.
FIG. 4 is a wiring diagram of said electrical components.

The unitary and compact form of the present device is illustrated in FIGS. 1, 2 and 3, which show a dielectric housing 5 mounting a switch test jack 6 that adapts the device for facile connection to the terminals of a Strowger telephone switch, a faceplate 7 serving as a cover for the interior of the housing 5, and mounting a telltale lamp 8, and an electric circuit board assembly 9 carried by said faceplate and mounting the various electrical components and elements of the circuitry shown in FIG. 4.

The housing 5 is preferably formed of high-impact plastic and in the parallelepiped form shown.

When the test jack 6, commonly called a 240 A plug, is connected to the Strowger telephone switch in the line to be tested, common ground is fed from the jack spring #4 of the Stowger switch to springs #3 and #4 of the mentioned plug. Spring #4 of said plug is common to all of the ground points of the device. Negative potential is obtained from either spring #1 (ring side of the line) or spring #2 (tip side of the line) on the switch's test jack through the 240 A plug. The difference of potential between the tip and ring sides of the line will develop voltage across a holding resistor 10 in the line connection component of the device. A diode OR gate composed of diodes 12 and 11 in said component will select the most negative end of the resistor 10 as supply voltage of the device. From a point 13 in said line connection component, negative voltage is supplied to resistor 14 in a lamp-flashing circuit, resistors 15 and 16 in a 1,000 c.p.s. oscillator, resistors 17 and 18 in a 3 c.p.s. oscillator, and the emitters of the transistors 19 and 20, respectively, in the 1,000 c.p.s. oscillator and 3 c.p.s. oscillator.

The 1,000 c.p.s. component is an audio oscillator of the phase shift type. Negative voltage through lines 21 and 22 is fed to the emitter of the transistors 19. Positive voltage is supplied from ground through a resistor 23, through line 24, to the collector of said transistor. The latter is turned on with positive voltage to its base through lines 24 and 25 from resistors 23 and 26. An AC signal is thus developed across transistor 19 and appears at point 27 connecting lines 24 and 25. A portion of said AC signal passes through a capacitor 28 in a line 29 between said point 27 and a point 30. From the latter point, some of the signal passes through resistor 15 to the negative supply lines 22 and 21, some of the signal passes through a capacitor 31 to a point 32 and through resistor 16 to said negative supply lines 22 and 21, and some of the signal passes through a capacitor 33 in a line 34 to the base of the transistor 19. In the process of traveling from point A to said base of transistor 19, the signal voltage undergoes a 180° phase shift caused by the properties of the capacitors 28, 31 and 33, and resistors 15 and 16, as well as the input resistance of the transistor 19, the same comprising the phase shift network of the 1,000 c.p.s. oscillator.

The above is brought about because the transistor 19 displays a 180° voltage phase shift between its base and collector. A signal applied to said base will be shifted 180° in phase by the transistor and 180° by the phase shift network, and then reapplied to the base.

Thus, the signal will tend to regenerate itself as long as power is applied to the circuit to compensate for its inefficiencies. The signal to start the oscillator is supplied when the device is initially connected to the power by the surges involved in the partial charging of the capacitors 29, 31 and 33. After this excitation, the frequency at which the oscillations occur will be determined by the values of the capacitors and resistors comprising the phase shift network.

The 3 c.p.s. component is an interrupter oscillator of the phase shift type. From the mentioned point 13, negative voltage through lines 21 and 35 is fed to the emitter of the transistor 20. Positive voltage is supplied from ground, through a resistor 36 to the collector of transistor 20, which is, thereby, turned on with positive voltage to its base from resistor 36 and a resistor 37. An AC signal is developed across the transistor 20 and appears at point 38. A portion of this AC signal passes through a capacitor 39 to a point 40 from which some of the signal passes through a resistor 17 to the negative supply and some of the signal passes through a capacitor 41 to a point 42. From said point, some signal passes through resistor 18 to the negative supply and some through a capacitor 43 to the base of the transistor 20. The similarity of the above to the travel of the voltage through the audio oscillator will be apparent. Also, it will be seen that the precess of traveling from point 38 to said base of transistor 20 will undergo the above-mentioned 180° phase shift; the same, similarly, is caused by the properties of capacitors 39, 41 and 43, resistors 36 and 37, and the input resistance of transistor 20, which comprise the shift network.

The audio oscillator is controlled by the interrupter oscillator by the following means and in the following manner.

The voltage phase shift displayed by transistor 20 is similar to that described above for the voltage phase shift displayed by transistor 19, i.e., the signal applied to the base is shifted in phase 180° and reapplied to said base; the signal will regenerate itself as long as power is continued to be applied; the signal to start is supplied by the surges involved in the partial charging of capacitors 28, 31 and 33; and the values of said capacitors and the resistors 15 and 16 determine the frequency of oscillations of the phase shift network.

The signal voltage of transistor 20, from the point 38, is fed through a resistor 44 in a line 45 to the line 34 and the base of transistor 19. During periods of operation when the collector of transistor 20 is near its peak negative alternation, resistor 26 controls the bias of transistor 19 and allows it to oscillate at the high frequency, in this case 1,000 c.p.s. due to a 390 K rating of the latter resistor. When, at point 38, the alternation is nearer its peak positive, the resistor 44 feeds positive potential through resistor 37 to the base of transistor 20, causing it to cease oscillating. In this manner, the collector of transistor 20 swings positive and negative at the high frequency and the oscillations of transistor 19 will be interrupted at said rate.

The lamp-flashing circuit component is controlled by the low-frequency interrupter oscillator by the following means and in the following manner.

A portion of the output of transistor 20 at point 38 of the interrupter oscillator is fed through resistor 46 in a line 47 extending from said point to a Zener diode 48 in the lamp-flashing circuit, and from said diode through a line 49 to the base of a transistor 50. During periods of oscillation of transistor 20 and when the point 38 is near its most positive alternation, insufficient voltage is present in line 47 to enable diode 48 to conduct, and transistor 50 is turned off due to lack of base bias. When said line 47 swings more negative, it will reach a level of voltage sufficient to enable diode 48 to conduct, thereby supplying negative bias to the base of transistor 50 and, in turn, causing it to conduct.

In said lamp-flashing circuit, the bore of transistor 50 swings negative, turning the same on, as above explained: ground, through the conductor of said transistor connects to a line 51 and passes through the filament 52 of a lamp 8 in said line, until a predetermined level of voltage appears across a Zener diode 53 in said line 51 in series with filament 52. In this case, said predetermined voltage is 6.2 v. Thus, when 6.2 v. appears across diode 53, it becomes conductive and completes a path through line 54 and resistor 14 to the junction point 13 of diodes 11 and 12, thus lighting lamp 8.

The above-described device for tracing the switch train of a telephone line or trunk, by means of the mentioned 240 A plug and an audio transmission line, operates as follows:

The springs #1 and #2 of said plug are connected to "A" relay windings 55 which, as is common, have a high impedance to AC. There is a series path from negative 48 v. through one A relay winding 55, and through resistor 10 through the other A relay winding 55 winding to ground. The end of resistor 10 with the winding 55 connected to battery will be the most negative end. Provided that tip (#2) and ring (#1) are not shorted, diode 11 will be the only one that is conducting. The AC signal of the audio oscillator will be fed out to the line through said diode 11 and will appear across resistor 10 and the relay winding 55. The portion of the signal caused to appear across the latter resistor may be detected between the tip and ring wires 56 of the telephone line. Even when the tip and ring sides of the line are shorted together, the signal voltage will appear across said A relay winding and may be detected between either side of the telephone line (tip or ring) and ground.

Except for the lamp 8, which is carried by the cover plate 7, and the 240 A plug, which is mounted on the outside of the housing 5, all of the above-described elements of the two oscillators, the lamp-flashing circuit, and the line connection unit, are mounted on the circuit board assembly 9. The latter, by angle brackets 57, is mounted on the cover plate 7.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. A self-contained, solid-state device for tracing a telephone switch train in a telephone central office and which is provided with selector contacts, said device being adapted for separable connection to a switch test jack of a telephone central office, said device receiving its power from the switch train, and comprising:

line connection means to said train and the power source thereof, the ground of the power source being connected to the emitter of the third transistor, and the collector of the latter transistor being connected to the filament of the lamp, a high-frequency audio oscillator of the phase shift type including a transistor having its emitter connected to the negative of said power source and having its collector connected to receive positive voltage from positive ground of said source to turn on the transistor, two phase shift networks each comprising a resistor and capacitor connected across the emitter and collector of said transistor, the base of said transistor being connected to receive the AC signal developed across the transistor, a low-frequency interrupter oscillator of the phase shift type connected across the high-frequency oscillator and having a transistor, resistor and capacitors in circuit similar to that of said high-frequency oscillator, the AC signal to start the low-frequency oscillator being supplied by the power source and by the surges involved in the partial charging of the latter capacitors, and a lamp-flashing circuit including a series arrangement between the base of the transistor of the low-frequency oscillator and the steering diodes thereof, of a transistor-switching Zener diode, a third transistor, a lamp, and a second Zener diode for limiting lamp voltage and opposed to the first diode, and a ground from said power source connected to the filament of said lamp through said third transistor, a portion of the outlet of the transistor of the low-frequency oscillator being fed through said circuit through the first Zener diode to the base of the third transistor, the latter diode being conductive to the third transistor when the alternations in the low-frequency oscillator swing more negative, the third transistor being switched into conductance, causing the lamp to light and the second Zener diode to limit the voltage to the lamp filament.

2. A device according to claim 1 in which the line connection means receives current flow from a switch test jack provided with ring and tip terminals, the mentioned loop-holding resistor is connected across said terminals, and the mentioned steering diodes are connected, respectively, one to the ring terminal and the other to the tip terminal.

3. A device according to claim 2 in which the output sides of the steering diodes are commonly connected, and the two oscillators and the lamp-flashing circuit are connected in series with said steering diodes.